US010970682B1

(12) United States Patent
Aykin

(10) Patent No.: US 10,970,682 B1
(45) Date of Patent: Apr. 6, 2021

(54) SYSTEM AND METHOD FOR AGENT SCHEDULING USING MIXED INTEGER LINEAR PROGRAMMING

(71) Applicant: inContact, Inc., Salt Lake City, UT (US)

(72) Inventor: Turgut Aykin, Hazlet, NJ (US)

(73) Assignee: INCONTACT, INC., Salt Lake City, UT (US)

( * ) Notice: Subject to any disclaimer, the term of this patent is extended or adjusted under 35 U.S.C. 154(b) by 1083 days.

(21) Appl. No.: 14/730,359

(22) Filed: Jun. 4, 2015

(51) Int. Cl.
*G06Q 10/10* (2012.01)
*G06N 5/02* (2006.01)

(52) U.S. Cl.
CPC .......... *G06Q 10/1093* (2013.01); *G06N 5/02* (2013.01)

(58) Field of Classification Search
CPC .............. G06Q 10/1093; G06Q 10/06; G06Q 10/063116; G06Q 10/06311; G06Q 10/0631
See application file for complete search history.

(56) References Cited

U.S. PATENT DOCUMENTS

| | | | | |
|---|---|---|---|---|
| 5,111,391 A * | 5/1992 | Fields | .................... | G06Q 10/06 705/7.14 |
| 5,185,780 A * | 2/1993 | Leggett | .................. | G06Q 10/06 379/265.08 |
| 5,325,292 A * | 6/1994 | Crockett | ................ | G06Q 10/06 705/7.18 |
| 5,911,134 A * | 6/1999 | Castonguay | ........... | G06Q 10/06 705/7.12 |

(Continued)

OTHER PUBLICATIONS

Choy, Murphy et al., A Flexible Mixed Integer framework for Nurse Scheduling Cornell University, Oct. 12, 2012 (Year: 2012).*
Genova, Krasimira, A Heuristic Algorithm for Solving Mixed Integer Problems Cybernetics and Information Technologies, vol. 11, No. 2011 (Year: 2011).*
Fischetti, Matteo et al., Heuristics in Mixed Integer Programming Wiley Encyclopedia of Operations Research and Management Science, 2010 (Year: 2010).*

(Continued)

*Primary Examiner* — Scott L Jarrett
(74) *Attorney, Agent, or Firm* — Pearl Cohen Zedek Latzer Baratz LLP

(57) ABSTRACT

A computer implemented method for agent scheduling using a Mixed Integer Programming (MILP) model, and a Mixed Integer Programming and Search Heuristic (MILP&SH) algorithm. The MILP model of the invention comprises of an objective function, decision variables, and constraints expressing tour group and shift template rules and required staffing levels as equations and inequalities. The MILP&SH algorithm comprises of an MILP solution algorithm and a search heuristic. The MILP solution algorithm applied to the MILP model to generate a plurality of solutions. If a solution generated by the MILP solution algorithm is an integer feasible solution, the search heuristic generates agent schedules. If a solution is not an integer feasible solution, the steps of the search heuristic are executed to find an integer feasible solution. The search heuristic compares the objective function value for an integer feasible solution found with the objective value for the best solution. If the integer feasible solution has a better objective function value, the best solution is replaced with the integer feasible solution. The MILP&SH algorithm iterates to generate integer feasible solutions, and updating the best solution and associated agent schedules. The MILP&SH algorithm terminates with a best solution found when one or more stopping conditions are satisfied.

19 Claims, 7 Drawing Sheets

(56) References Cited

U.S. PATENT DOCUMENTS

| | | | | |
|---|---|---|---|---|
| 6,070,144 | A * | 5/2000 | Ginsberg | G06Q 10/06 705/7.17 |
| 6,278,978 | B1 * | 8/2001 | Andre | G06Q 10/06 705/7.13 |
| 6,651,046 | B1 * | 11/2003 | Sato | G06Q 99/00 706/13 |
| 7,725,339 | B1 * | 5/2010 | Aykin | G06Q 10/10 705/7.14 |
| 7,991,713 | B2 * | 8/2011 | Triantafillidis | H04L 47/823 706/14 |
| 8,577,706 | B1 * | 11/2013 | Aykin | G06Q 10/063 705/7.11 |
| 8,612,272 | B1 * | 12/2013 | Aykin | G06Q 10/063 705/7.11 |
| 9,906,648 | B2 * | 2/2018 | Wicaksono | H04M 3/5175 |
| 10,102,487 | B2 * | 10/2018 | Jacobs | G06Q 10/063116 |
| 10,115,065 | B1 * | 10/2018 | Fama | G06Q 10/06311 |
| 2004/0049479 | A1 * | 3/2004 | Dorne | G06Q 10/04 |
| 2008/0300954 | A1 * | 12/2008 | Cameron | G06Q 10/00 705/7.16 |
| 2010/0076898 | A1 * | 3/2010 | Beshears | G06Q 10/103 705/301 |
| 2011/0077994 | A1 * | 3/2011 | Segev | G06Q 10/06 705/7.16 |
| 2013/0054289 | A1 * | 2/2013 | SenGupta | G06Q 10/06 705/7.13 |
| 2013/0117752 | A1 * | 5/2013 | Li | G06F 9/5066 718/102 |
| 2014/0136260 | A1 * | 5/2014 | Dasgupta | G06Q 10/063118 705/7.17 |
| 2014/0330605 | A1 * | 11/2014 | Connolly | G06Q 10/063116 705/7.16 |

OTHER PUBLICATIONS

Aykin, Turgut, Optimal Shift Scheduling with Multiple Break Windows Management Science, vol. 42, No. 4, Apr. 1996 (Year: 1996).*

Balas, Egon et al., Pivot and Shift—a mixed integer programming heuristic Discrete Optimization, vol. 1., 2004 (Year: 2004).*

Beaumont, Nicholas, Scheduling staff using mixed integer progamming European Journal of Operational Research, vol. 98, 1997 (Year: 1997).*

IBM ILOG CPLEX V12.1—User's Manual for CPLEX IBM, 2009 (Year: 2009).*

Aykin, Turgut, "Optimal Shift Scheduling with Multiple Break Windows", Management Science, vol. 42, No. 4 (Apr. 1996), pp. 591-602.

Balas et al., "Pivot and shift-a mixed integer programming heuristic", Discrete Optimization 1, No. 1 (2004), pp. 3-12.

Beaumont, Nicholas. "Scheduling staff using mixed integer programming.", European journal of operational research 98, No. 3 (1997), pp. 473-484.

Choy et al., "A Flexible Mixed Integer Programming framework for Nurse Scheduling", Cornell University, Oct. 12, 2012.

Fischetti, et al., "Heuristics in mixed integer programming." Wiley Encyclopedia of Operations Research and Management Science (2010), pp. 1-6.

Genova, Krasimira, "A heuristic algorithm for solving mixed integer problems." Cybernetics and Information Technologies 11, No. 2 (2011), pp. 3-12.

"User's Manual for CPLEX", IBM ILOG CPLEX V12.1 (2009), pp. 1-952.

Wolsey, Laurence A., "Integer programming", Wiley (1998) pp. 1-99.

* cited by examiner

FIG. 4

| Number of Days-off | Number of Consecutive Days-off | 1 | 2 | 3 | 4 | 5 | 6 | 7 |
|---|---|---|---|---|---|---|---|---|
| 0 | 0 | 1 | 1 | 1 | 1 | 1 | 1 | 1 |
| 1 | 1 | 0 | 1 | 1 | 1 | 1 | 1 | 1 |
|   | 1 | 1 | 0 | 1 | 1 | 1 | 1 | 1 |
|   | 1 | 1 | 1 | 0 | 1 | 1 | 1 | 1 |
|   | 1 | 1 | 1 | 1 | 0 | 1 | 1 | 1 |
|   | 1 | 1 | 1 | 1 | 1 | 0 | 1 | 1 |
|   | 1 | 1 | 1 | 1 | 1 | 1 | 0 | 1 |
|   | 1 | 1 | 1 | 1 | 1 | 1 | 1 | 0 |
| 2 | 2 | 0 | 0 | 1 | 1 | 1 | 1 | 1 |
|   | 2 | 1 | 0 | 0 | 1 | 1 | 1 | 1 |
|   | 2 | 1 | 1 | 0 | 0 | 1 | 1 | 1 |
|   | 2 | 1 | 1 | 1 | 0 | 0 | 1 | 1 |
|   | 2 | 1 | 1 | 1 | 1 | 0 | 0 | 1 |
|   | 2 | 1 | 1 | 1 | 1 | 1 | 0 | 0 |
|   | 1 | 0 | 1 | 1 | 1 | 1 | 1 | 0 |
|   | 1 | 0 | 1 | 0 | 1 | 1 | 1 | 1 |
|   | 1 | 0 | 1 | 1 | 0 | 1 | 1 | 1 |
|   | 1 | 0 | 1 | 1 | 1 | 0 | 1 | 1 |
|   | 1 | 0 | 1 | 1 | 1 | 1 | 0 | 1 |
|   | 1 | 1 | 0 | 1 | 0 | 1 | 1 | 1 |
|   | 1 | 1 | 0 | 1 | 1 | 0 | 1 | 1 |
|   | 1 | 1 | 0 | 1 | 1 | 1 | 0 | 1 |
|   | 1 | 1 | 0 | 1 | 1 | 1 | 1 | 0 |
|   | 1 | 1 | 1 | 0 | 1 | 0 | 1 | 1 |
|   | 1 | 1 | 1 | 0 | 1 | 1 | 0 | 1 |
|   | 1 | 1 | 1 | 0 | 1 | 1 | 1 | 0 |
|   | 1 | 1 | 1 | 1 | 0 | 1 | 0 | 1 |
|   | 1 | 1 | 1 | 1 | 0 | 1 | 1 | 0 |
|   | 1 | 1 | 1 | 1 | 1 | 0 | 1 | 0 |
| 3 | 3 | 0 | 0 | 0 | 1 | 1 | 1 | 1 |
|   | 3 | 1 | 0 | 0 | 0 | 1 | 1 | 1 |
|   | 3 | 1 | 1 | 0 | 0 | 0 | 1 | 1 |
|   | 3 | 1 | 1 | 1 | 0 | 0 | 0 | 1 |
|   | 3 | 1 | 1 | 1 | 1 | 0 | 0 | 0 |
|   | 3 | 0 | 1 | 1 | 1 | 1 | 0 | 0 |
|   | 3 | 0 | 0 | 1 | 1 | 1 | 1 | 0 |
|   | 2 | 0 | 0 | 1 | 1 | 0 | 1 | 1 |
|   | 2 | 0 | 0 | 1 | 1 | 1 | 0 | 1 |
|   | 2 | 0 | 0 | 1 | 1 | 1 | 1 | 0 |
|   | 2 | 1 | 0 | 0 | 1 | 0 | 1 | 1 |
|   | 2 | 1 | 0 | 0 | 1 | 1 | 0 | 1 |
|   | 2 | 1 | 0 | 0 | 1 | 1 | 1 | 0 |
|   | 2 | 1 | 1 | 0 | 0 | 1 | 0 | 1 |
|   | 2 | 1 | 1 | 0 | 0 | 1 | 1 | 0 |
|   | 2 | 0 | 1 | 0 | 0 | 1 | 1 | 1 |
|   | 2 | 1 | 1 | 1 | 0 | 0 | 1 | 0 |
|   | 2 | 0 | 1 | 1 | 0 | 0 | 1 | 1 |
|   | 2 | 1 | 0 | 1 | 0 | 0 | 1 | 1 |
|   | 2 | 0 | 1 | 1 | 1 | 0 | 0 | 1 |
|   | 2 | 1 | 0 | 1 | 1 | 0 | 0 | 1 |
|   | 2 | 1 | 1 | 0 | 1 | 0 | 0 | 1 |
|   | 2 | 1 | 0 | 1 | 1 | 1 | 0 | 0 |
|   | 2 | 1 | 1 | 0 | 1 | 1 | 0 | 0 |
|   | 2 | 1 | 1 | 1 | 0 | 1 | 0 | 0 |
|   | 2 | 0 | 1 | 0 | 1 | 1 | 1 | 0 |
|   | 2 | 0 | 1 | 1 | 0 | 1 | 1 | 0 |
|   | 2 | 0 | 1 | 1 | 1 | 0 | 1 | 0 |
|   | 1 | 0 | 1 | 0 | 1 | 0 | 1 | 1 |
|   | 1 | 0 | 1 | 0 | 1 | 1 | 0 | 1 |
|   | 1 | 0 | 1 | 1 | 0 | 1 | 0 | 1 |
|   | 1 | 1 | 0 | 1 | 0 | 1 | 0 | 1 |
|   | 1 | 1 | 0 | 1 | 0 | 1 | 1 | 0 |
|   | 1 | 1 | 0 | 1 | 1 | 0 | 1 | 0 |
|   | 1 | 1 | 1 | 0 | 1 | 0 | 1 | 0 |
| 4 | 4 | 0 | 0 | 0 | 0 | 1 | 1 | 1 |
|   | 4 | 1 | 0 | 0 | 0 | 0 | 1 | 1 |
|   | 4 | 1 | 1 | 0 | 0 | 0 | 0 | 1 |
|   | 4 | 1 | 1 | 1 | 0 | 0 | 0 | 0 |
|   | 4 | 0 | 1 | 1 | 1 | 0 | 0 | 0 |
|   | 4 | 0 | 0 | 1 | 1 | 1 | 0 | 0 |

FIG. 4 (Cont'd)

| | | | | | | | | |
|---|---|---|---|---|---|---|---|---|
| | 4 | 0 | 0 | 0 | 1 | 1 | 1 | 0 |
| | 3 | 0 | 0 | 0 | 1 | 0 | 1 | 1 |
| | 3 | 0 | 0 | 0 | 1 | 1 | 0 | 1 |
| | 3 | 1 | 0 | 0 | 0 | 1 | 0 | 1 |
| | 3 | 1 | 0 | 0 | 0 | 1 | 1 | 0 |
| | 3 | 1 | 1 | 0 | 0 | 0 | 1 | 0 |
| | 3 | 0 | 1 | 0 | 0 | 0 | 1 | 1 |
| | 3 | 0 | 1 | 1 | 0 | 0 | 0 | 1 |
| | 3 | 1 | 0 | 1 | 0 | 0 | 0 | 1 |
| | 3 | 1 | 0 | 1 | 1 | 0 | 0 | 0 |
| | 3 | 1 | 1 | 0 | 1 | 0 | 0 | 0 |
| | 3 | 0 | 1 | 0 | 1 | 1 | 0 | 0 |
| | 3 | 0 | 1 | 1 | 0 | 1 | 0 | 0 |
| | 3 | 0 | 0 | 1 | 0 | 1 | 1 | 0 |
| | 3 | 0 | 0 | 1 | 1 | 0 | 1 | 0 |
| | 2 | 0 | 0 | 1 | 0 | 0 | 1 | 1 |
| | 2 | 0 | 0 | 1 | 1 | 0 | 0 | 1 |
| | 2 | 1 | 0 | 0 | 1 | 0 | 0 | 1 |
| | 2 | 1 | 0 | 0 | 1 | 1 | 0 | 0 |
| | 2 | 1 | 1 | 0 | 0 | 1 | 0 | 0 |
| | 2 | 0 | 1 | 0 | 0 | 1 | 1 | 0 |
| | 2 | 0 | 1 | 1 | 0 | 0 | 1 | 0 |
| | 2 | 0 | 0 | 1 | 0 | 1 | 0 | 1 |
| | 2 | 1 | 0 | 0 | 1 | 0 | 1 | 0 |
| | 2 | 0 | 1 | 0 | 0 | 1 | 0 | 1 |
| | 2 | 1 | 0 | 1 | 0 | 0 | 1 | 0 |
| | 2 | 0 | 1 | 0 | 1 | 0 | 0 | 1 |
| | 2 | 1 | 0 | 1 | 0 | 1 | 0 | 0 |
| | 2 | 0 | 1 | 0 | 1 | 0 | 1 | 0 |
| 5 | 5 | 0 | 0 | 0 | 0 | 0 | 1 | 1 |
| | 5 | 1 | 0 | 0 | 0 | 0 | 0 | 1 |
| | 5 | 1 | 1 | 0 | 0 | 0 | 0 | 0 |
| | 5 | 0 | 1 | 1 | 0 | 0 | 0 | 0 |
| | 5 | 0 | 0 | 1 | 1 | 0 | 0 | 0 |
| | 5 | 0 | 0 | 0 | 1 | 1 | 0 | 0 |
| | 5 | 0 | 0 | 0 | 0 | 1 | 1 | 0 |
| | 4 | 0 | 0 | 0 | 0 | 1 | 0 | 1 |
| | 4 | 1 | 0 | 0 | 0 | 0 | 1 | 0 |
| | 4 | 0 | 1 | 0 | 0 | 0 | 0 | 1 |
| | 4 | 1 | 0 | 1 | 0 | 0 | 0 | 0 |
| | 4 | 0 | 1 | 0 | 1 | 0 | 0 | 0 |
| | 4 | 0 | 0 | 1 | 0 | 1 | 0 | 0 |
| | 4 | 0 | 0 | 0 | 1 | 0 | 1 | 0 |
| | 3 | 0 | 0 | 0 | 1 | 0 | 0 | 1 |
| | 3 | 1 | 0 | 0 | 0 | 1 | 0 | 0 |
| | 3 | 0 | 1 | 0 | 0 | 0 | 1 | 0 |
| | 3 | 0 | 0 | 1 | 0 | 0 | 0 | 1 |
| | 3 | 1 | 0 | 0 | 1 | 0 | 0 | 0 |
| | 3 | 0 | 1 | 0 | 0 | 1 | 0 | 0 |
| | 3 | 0 | 0 | 1 | 0 | 0 | 1 | 0 |
| 6 | 6 | 0 | 0 | 0 | 0 | 0 | 0 | 1 |
| | 6 | 1 | 0 | 0 | 0 | 0 | 0 | 0 |
| | 6 | 0 | 1 | 0 | 0 | 0 | 0 | 0 |
| | 6 | 0 | 0 | 1 | 0 | 0 | 0 | 0 |
| | 6 | 0 | 0 | 0 | 1 | 0 | 0 | 0 |
| | 6 | 0 | 0 | 0 | 0 | 1 | 0 | 0 |
| | 6 | 0 | 0 | 0 | 0 | 0 | 1 | 0 |
| 7 | | 0 | 0 | 0 | 0 | 0 | 0 | 0 |

SYSTEM AND METHOD FOR AGENT SCHEDULING USING MIXED INTEGER LINEAR PROGRAMMING

Related U.S. Patent Documents

| 6,278,978 | August 2001 | Andre et al. | 705/7.13 |
|---|---|---|---|
| 7,725,339 B1 | May 2010 | Aykin | 705/7, 705/10 |

OTHER PUBLICATIONS

Wolsey, L. A., *Integer Programming*, John Wiley & Sons, 1998.

FIELD OF INVENTION

The invention pertains to the field of computer systems and computer implemented methods. More specifically, the invention pertains to computer systems and computer implemented methods for resource scheduling to meet the service performance targets in skills-based or non-skills based environments serving a plurality of work groups with time varying work volumes and work times.

BACKGROUND

Resource scheduling is a critical management process in managing systems that process or serve work items with the help of one or more resource groups over a period of time. The process of scheduling resources to meet required staffing levels while minimizing or maximizing an objective criterion has received considerable attention. For example, the objective criterion may be to minimize cost, paid time, agent hours, or maximize profit, sales, processed work items, etc. Resource scheduling is found in many diverse systems. Scheduling employees answering inbound calls, making outbound calls, replying to virtual chat inquiries, social media postings, sending emails or doing some other type of non-phone office type work at contact centers are examples of this process. Other examples include scheduling healthcare workers at hospitals, bank employees at bank branches, claim processing employees at insurance companies, cashiers at supermarkets, repair and installation technicians at communications and cable companies, workers at retail stores, machinery requiring periodic maintenance or cooling, etc.

For resource scheduling, callers seeking services from contact centers, patients seeking help at hospitals, customers at bank branches, supermarkets, retail store, and claims at insurance companies, repair and installation requests at communication and cable companies are the work items. The number of such work items to be processed or served may vary over time.

In these systems, employees (referred to as "agents" in the remainder of this patent document) are scheduled for work and break over a period of time so that they can process or serve work items to meet certain service completion targets ("service targets"). The system may process a plurality of work item types ("work type") each with skill and knowledge requirements. Moreover, each agent may have one or more skills to process or serve one or more work types.

An agent schedule ("agent schedule") is prepared to specify work and break periods for a period of time. The period covered by a plurality of agent schedules ("schedule period") may be one day or an entire period comprising of a plurality of days specifying, in addition to daily work start, end and break times, work and non-work days over the period. A non-work day is an off day with no work for the agent. For example, agents at contact centers are usually scheduled a week at a time while health care workers may be scheduled for a month. A schedule or portion of a schedule specifying all work and break periods together with their start and end times for one day is called a daily shift ("daily shift"). Agent schedules comprising of a plurality of daily shifts for work days, and non-work days are called tour schedules ("tour schedule").

U.S. Pat. No. 7,725,339 entitled "Contact Center Scheduling Using Integer Programming" granted to Aykin is incorporated here in its entirety as background. U.S. Pat. No. 7,725,339 describes a method using Mixed Integer Linear Programming (MILP) and a solutions algorithm for developing agent schedules. The MILP model described in U.S. Pat. No. 7,725,339 allows tour schedules with varying daily shifts lengths.

However, the MILP model of the method described in U.S. Pat. No. 7,725,339 does not allow the specification of a minimum and a maximum number of daily shifts with a specific length in an agent schedule. An example for such a tour schedule is an agent schedule comprising of i) four to five days of work and two to three days non-work over a week, and ii) with two to three 8-hour daily shifts, and two to three 6-hour daily shifts for the work days. The present invention describes an MILP model and a solution algorithm for these types of scheduling requirements.

SUMMARY OF THE INVENTION

The present invention describes a computer system and computer implemented method for scheduling agents over a scheduling period to meet staffing requirements. The method formulates the requirements for generating schedules for a plurality of agents and work types as an MILP model including various scheduling rules as constraints. The formulation step of the present invention involves, first, the definitions of various decision variables, and parameters, and the formulation of an objective function. The objective function of the MILP model of the present invention provides a measure of effectiveness for each set of schedules. Examples of the objective function in the method include total schedule cost, total time scheduled, total paid time scheduled, total agent preference, total sales, total profit, total processed work items, etc. The formulation step also includes the formulation of constraints to be satisfied by the schedules created as mathematical equations or inequalities. Finally, constraints that restrict the values of all decision variables to nonnegative values, and some decision variables to nonnegative integer values ("integer variables") only are added to the formulation.

A set of values for the decision variables of the MILP model specifies a set of agent schedules. Every such set of values for the decision variables of the MILP model is called a solution ("solution"). If a solution also satisfies all of the constraints of the MILP model including integer value requirements for integer variables, it is called an integer feasible solution ("integer feasible solution"). Evaluating the objective function of the MILP model using the values of the decision variables ("objective function value") in a given integer feasible solution provides a measure of effectiveness for that solution.

The MILP model of the present invention is then solved repeatedly using an MILP solution algorithm supplemented by a search heuristic ("MILP&SH algorithm") until one or more stopping conditions are satisfied. Values of the decision variables in the integer feasible solution with the best objective function value found by the MILP&SH algorithm are used to generate the final agent schedules and assign to agents.

In another aspect of the present invention, we disclose a computer system with a non-transitory computer readable medium and a computer program embodying a program of instructions stored in the computer system's memory which, when executed, perform the method according to the invention.

BRIEF DESCRIPTION OF THE DRAWINGS

For a more complete description of the present invention and its merits, reference should be made to the Detailed Description.

FIG. 4 shows all possible work and non-work day patterns for a seven-day long agent schedule.

DETAILED DESCRIPTION

Figure 1:
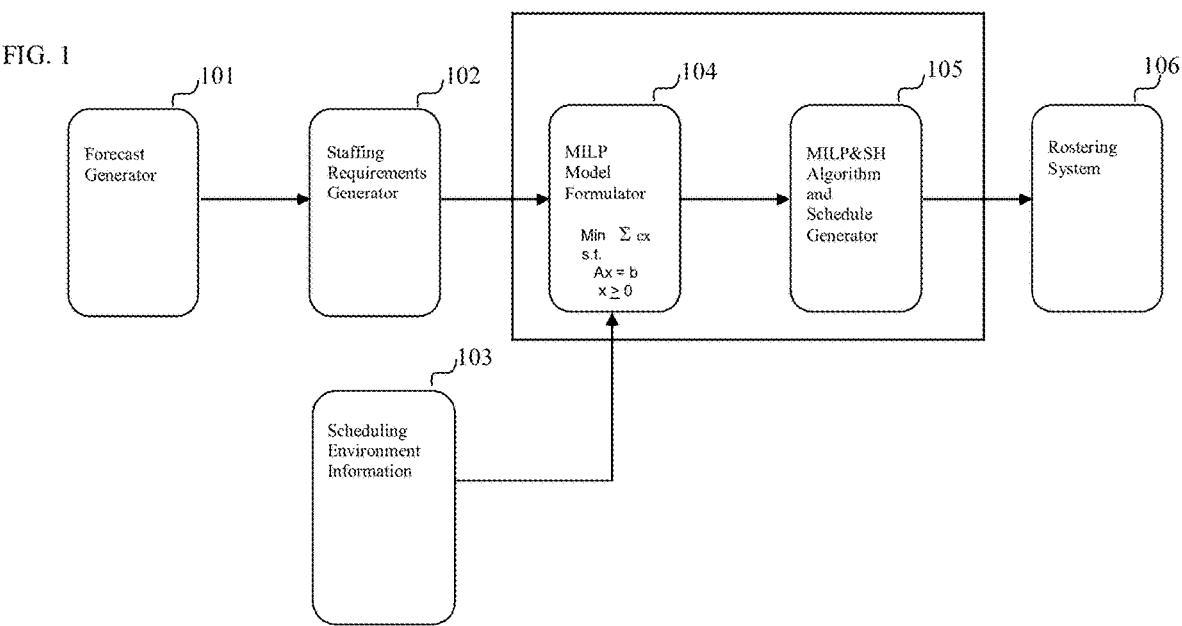
FIG. 1 shows a functional block diagram for a computer system for an agent scheduling system.

Referring to the drawings, FIG. 1 shows a functional block diagram of a computer system with a non-transitory computer readable medium and a computer program embodying a program of instructions stored in the computer system's memory which, when executed, perform the method of the invention for agent scheduling. The computer system includes the functional blocks for: 1) receiving required staffing levels ("required staffing level") from a staffing requirements generator 102 ("staffing requirements generator") needed to meet a plurality of customer service targets in processing work items for a plurality of work types, 2) acquiring the scheduling environment information 103, 3) formulating the MILP model of the invention 104, and 4) schedule generator 105 to solve the MILP model using the MILP&SH algorithm until one or more stopping criteria are met. Agent schedules generated are inputted to a rostering system 106 to assign agents.

In order to schedule agents efficiently, a work day is divided into smaller time intervals ("interval"). For example, an interval may be 15- or 30-minute long at contact centers. It may be ½ hour or an hour for retails stores, banks and hospitals. A required staffing level is provided by the staffing requirements generator 102 for each interval during which agents may be scheduled to process work items.

Required staffing levels may be generated 102 in different ways. Required staffing levels may be calculated using work volume and average processing time per work item forecasts generated by a forecast generator 101. For example, for email processing, they may be calculated as the amount of work in hours by multiplying the number of emails to be answered by the average processing time to answer an email, and then distributing this over a period to complete. In another embodiment, it may be calculated using a staffing model similar to the well know Erlang C, Erlang A, other queueing models or simulation. For example, calculating the required staffing levels using a staffing model is the preferred approach for phone based work types at contact centers. In another embodiment, required staffing levels may be entered or uploaded by a user using the user interface of the computer system.

Scheduling environment information 103 is stored on one or more computer systems. This information includes at least the following: a schedule period in number of days and start day, intervals on each day during which agents can work, rules for tour schedules and daily shifts, minimum and maximum number of agents that can be scheduled, objective criterion for evaluating the merits of a set of agent schedules, and the direction of optimization as either maximize or minimize the objective criterion.

Figure 2:
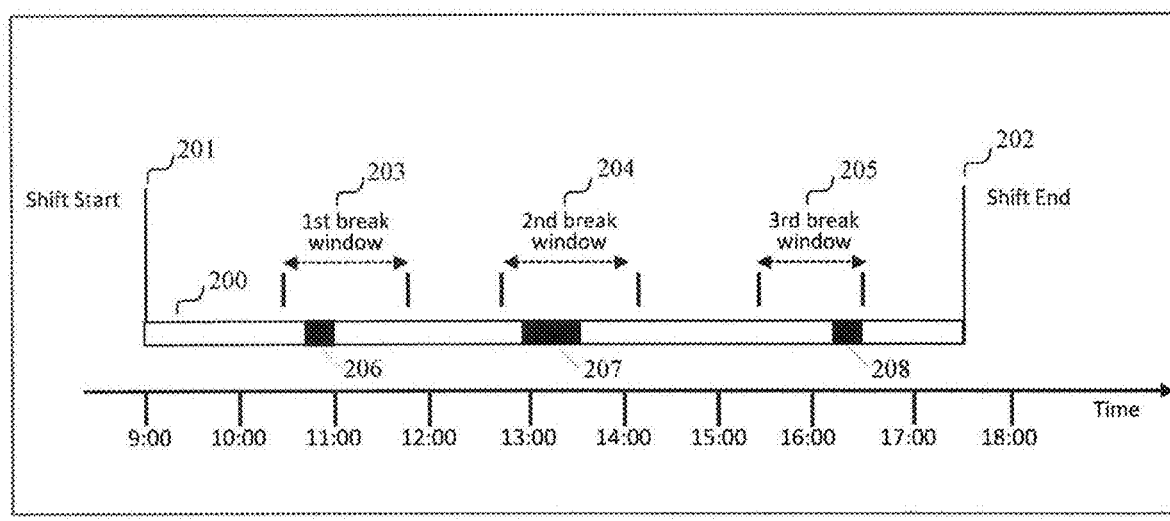
FIG. 2 shows the details of a daily shift with three breaks and break windows.
Figure 3:
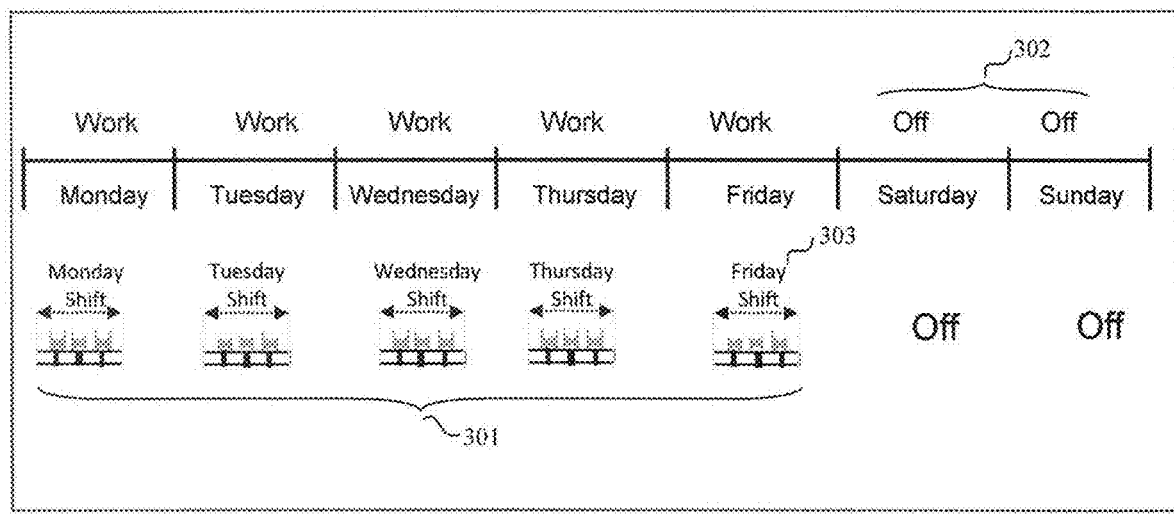
FIG. 3 shows a weekly agent schedule comprising of five days of work and two days of non-work.

The information stored 103 for an example tour group and example shift template is shown in FIG. 2 and FIG. 3, and further explained below.

Agents are scheduled to meet the required staffing levels received from the staffing requirements generator 102. Agents are scheduled for one or more days. FIG. 2 shows a daily shift. Shift start time 201 and shift end time 202 specify intervals for the start and end of a daily shift and its length. A shift starts at the beginning of the shift start time interval ("shift start time") 201 and ends at the end of the shift end interval ("shift end time") 202. A shift may have one or more breaks. Each break may have to be scheduled to start within a break window consisting of one or more intervals. For example, break window for the $1^{st}$ break 203 specifies the earliest and latest times the $1^{st}$ break may be scheduled to start. The $1^{st}$ break 206 is scheduled to start and end between the break window start and end times. A daily shift also specifies start and end times for the breaks. Rules for shift length, possible shift start times, number of breaks, break lengths, break window start and end times, break start times within the break windows, and minimum work time between successive breaks together define a shift template ("shift template"). For example, if the length of an interval is 30 minutes, a shift template may specify a 9-hour long shift with: i) two one-interval long breaks, ii) one two-interval long break, and iii) shift start times every half hour from 7:00 to 14:00. Moreover, the break window for the $1^{st}$ one-interval long break may be set to start after 1.5 (one and a half) hours and end 2.5 hours after the shift start time. In this example, $1^{st}$ break start times ("break start time") may be 1.5, 2 and 2.5 hours after the shift start time. Likewise, the break window for the $2^{nd}$ break may start 3.5 hours after the shift start and end 4.5 hours after the shift start with possible break start times of 3.5, 4.0 and 4.5 hours after the shift start, and the break window for the $3^{rd}$ break may start 7 hours after the shift start and end 7.5 hours after the shift start with possible break start times of 7.0 and 7.5 hours after the shifts start time. A shift template may specify no break, one break or a plurality of breaks.

An agent schedule may be one or more days. FIG. 3 shows an example agent schedule that is seven days long. When an agent schedule is for a plurality of days, number of work 301 and non-work days 302 may also be specified. It may also be desirable to specify a minimum and maximum number of weekend days as non-work days. Likewise, the minimum number of consecutive non-work or work days, specific days as work or non-work days, and whether the daily shift start times or break start times should be identical (e.g. the same daily shift start time 9:00 for every work day) may be specified. These and similar weekly scheduling rules ("weekly scheduling rules") are within the scope of the present invention. Weekly scheduling rules together with the shift templates for daily shifts define a tour group ("tour group"). A plurality of tour groups may be specified for agent schedules. An agent schedule created using a tour group will specify work and non-work days, and for the work days, daily shift schedules 303 with daily shift start and end times and break start and end times.

For example, a tour group may have one or more of the following requirements:

1. The tour group may have one or more shift templates to use for daily schedules. For example, the tour group may have a 9-hour long shift template and a 5-hour long shift template;
2. The tour group may specify a minimum and a maximum number of daily shifts using each shift template. For example, the tour group may specify 0 to 2 work days with daily shifts scheduled using the 5-hour shift template, and 3 to 5 work days with daily shifts scheduled using the 9-hour shift template.
3. Specific day of a schedule may also be selected, not selected or may be optional as a work day for the tour group or for a template. For example, the tour group may require day 1 and 2 of the agent schedule to be work days with the 9-hour long shift template while day 3 and 4 be non-work days for an agent schedule that may specify five work days over a seven-day schedule period.
4. The tour group may also have a minimum and a maximum number of work days or non-work days specified. For example, a tour group may specify 3 to 5 work days over a seven-day schedule period. Thus, an agent schedule created using this tour group may have 3, 4 or 5 work days over the schedule period;
5. The tour group may have work and non-work day constraints ("work and non-work day constraints"). The tour group may specify one non-work day on the weekend, two or more of the non-work days or work days to be consecutive.

The MILP model of the method described in U.S. Pat. No. 7,725,339 does not permit the specification of a minimum and a maximum number of daily shifts with a specific shift template in an agent schedule. This type of tour groups are preferred due to the flexibility they provide in scheduling agents. They may also be preferred to better fit into an agent's availability to work.

To facilitate the description of the MILP model of the present invention, a variable or set defined with a subscript is shown as flat text when the variable or set itself is a subscript of another term. For instance, a set defined as $B1_{kih}$ is typed as $_{B1kih}$ in $\Sigma_{t \epsilon B1kin}$ where it is a subscript of the summation sign $\Sigma$.

Let the set of all tour groups be K. Each tour group in K comprises of one or more shift templates. Let the set of shift templates specified for tour group k be $F_k$.

Tour group k, k$\epsilon$K, may have minimum and maximum number of work day constraints over the schedule period. Let the minimum number of work days required for tour group k be $TG_k^{min}$, and the maximum number of work days be $TG_k^{max}$, such that $TG_k^{min} \leq TG_k^{max}$. To meet the tour group work and non-work day constraints, the method of the invention first enumerates all possible work and non-work day patterns for all possible combinations of numbers of work and non-work days over the schedule period. FIG. 4 shows all possible work and non-work patterns for a seven-day schedule period. The minimum number of non-work days 401 is zero and maximum is seven. The number of consecutive non-work days 402 is also determined for each pattern. Work patterns ("work pattern") 403 are specified with a "0" for a non-work day and "1" for a work day. Work patterns satisfying the minimum $TG_k^{min}$ and maximum $TG_k^{min}$ number of work day constraints of tour group k, k$\epsilon$K are selected to be included in $L_k$. Work patterns in $L_k$ must also satisfy the specific work and non-work days as well as other weekly scheduling rules that may be specified for the tour group. Each work pattern l, l$\epsilon L_k$ specifies the values of the work pattern coefficients $A_{klh}$ for tour group k for day h as zero for a non-work day or one for a work day as in FIG. 4.

To simplify the description of the MILP model of the invention, it is presented for tour groups using daily shift templates with a maximum of three breaks. This assumption is merely made to simplify the presentation of the MILP model and in no way restricts the method of the invention to these types of shift templates. It is also assumed that if a shift template has: i) one break, it is one interval long, ii) two breaks then the first break is one interval and the second is two intervals long, and iii) three breaks, then first and third breaks are one interval and the second break is two intervals long. A shift template may have less than or more than three breaks with lengths of any number of intervals less than or equal to the daily shift length are also within the scope of the present invention. A person with ordinary skill in the art should appreciate that the MILP model of the invention is applicable to scheduling with shift templates with fewer or more than three breaks.

The MILP model of the method of the invention is presented below.

$$\text{Minimize } \Sigma_{k \epsilon K} \Sigma_{l \epsilon Lk} C_{kl} Q_{kl} + \Sigma_{k \epsilon K} \Sigma_{n \epsilon Fk} \Sigma_h \Sigma_{i \epsilon Ikh} C_{knhi} X_{knhi} + \Sigma_{t \epsilon Th} \Sigma_h P_{ht} B_{ht} \quad (1)$$

$$\text{Subject to } \Sigma_{k \epsilon K} \Sigma_{n \epsilon Fk} \Sigma_{i \epsilon Ikh} a_{kniht} X_{knhi} - \Sigma_{k \epsilon K} \Sigma_{n \epsilon Fk} \Sigma_{i \epsilon T1knht} U_{kniht} - \Sigma_{k \epsilon K} \Sigma_{n \epsilon Fk} \Sigma_{i \epsilon T2knht} (W_{kniht} + W_{knih(t-1)}) - \Sigma_{k \epsilon K} \Sigma_{n \epsilon Fk} \Sigma_{i \epsilon T3knht} V_{kniht} + B_{ht} - O_{ht} = b_{ht}, t \epsilon T_h, h = 1, \ldots, 7, \quad (2)$$

$$X_{knhi} = \Sigma_{t \epsilon B1knih} U_{kniht}, n \epsilon F_k, i \epsilon I_{kh}, k \epsilon K, h = 1, \ldots, 7, \quad (3)$$

$$X_{knhi} = \Sigma_{t \epsilon B2knih} W_{kniht}, n \epsilon F_k, i \epsilon I_{kh}, k \epsilon K, h = 1, \ldots, 7, \quad (4)$$

$$X_{knhi} = \Sigma_{t \epsilon B3knih} V_{kniht}, n \epsilon F_k, i \epsilon I_{kh}, k \epsilon K, h = 1, \ldots, 7, \quad (5)$$

$$\Sigma_{l \epsilon Lk} A_{klh} Q_{kl} = \Sigma_{n \epsilon Fk} \Sigma_{i \epsilon Ikh} X_{knhi}, k \epsilon K, h = 1, \ldots, 7, \quad (6)$$

$$TL_{kn}^{min} \{\Sigma_{l \epsilon Lk} Q_{kl}\} \leq \Sigma_{i \epsilon Ikh} \Sigma_h X_{knhi}, n \epsilon F_k, k \epsilon K, \quad (7)$$

$$\Sigma_{i \epsilon Ikh} \Sigma_h X_{knhi} \leq TL_{kn}^{max} \{\Sigma_{l \epsilon Lk} Q_{kl}\}, n \epsilon F_k, k \epsilon K, \quad (8)$$

$$\Sigma_{l \epsilon Lk} Q_{kl} \leq D_k^{max}, k \epsilon K, \quad (9)$$

$$\Sigma_{l \epsilon Lk} Q_{kl} \geq D_k^{min}, k \epsilon K, \quad (10)$$

$$X_{knhi}, Q_{kl}, U_{kniht}, W_{kniht}, V_{kniht} \geq 0 \text{ and integer, and } B_{ht}, \text{ and } O_{ht} \geq 0 \text{ for all, } k \epsilon K, n \epsilon F_k, i \epsilon I_{kh}, l \epsilon Lk, t \epsilon T_h, \text{ and } h = 1, \ldots, 7. \quad (11)$$

where $X_{knhi}$ is the number of agents scheduled using tour group k and shift template n with shift start time of interval i on day h, $U_{kniht}$ is the number of agents scheduled using tour group k and shift template n with shift start time of interval i on day h, and scheduled to start their $1^{st}$ break in interval t, $W_{kniht}$ is the number of agents scheduled using tour group k and shift template n with shift start time of interval i on day h, and scheduled to start their $2^{nd}$ break in interval t, $V_{kniht}$ is the number of agents scheduled using tour group k and shift template n with shift start time of interval i on day h, and scheduled to start their $3^{rd}$ break in interval t, $I_{kh}$ is the set of shift start times for tour group k on day h, $B1_{knih}$ is the set of break start times in the break window for the $1^{st}$ break for agents who are scheduled using tour group k, shift template n, and have a shift start time of interval i on day h, $B2_{knih}$ is the set of break start times in the break window for the $2^{nd}$ break for agents who are scheduled using tour group k, shift template n, and have a shift start time of interval i on day h, $B3_{knih}$ is the set of break start times in the break window for the $3^{rd}$ break for agents who are scheduled using tour group k, shift template n, and have a shift start time of interval i on day h, $T_h$ is the set of all intervals on day h during which an agent can work, $T1_{knht}$ is the set of shift start times for shift template n and tour group k for which interval t on day h is a break start time for the $1^{th}$ break, $T2_{knht}$ is the set of shift start times for shift template n and tour group k for which interval t on day h is a break start time for the $2^{nd}$ break, $T3_{knht}$ is the set of shift start times for shift template n and tour group k for which interval t on day h is a break start time for the $3^{rd}$ break, $a_{kniht}$ is equal to one if interval t on day h is a work period for agents who are scheduled using tour group k, shift template n, and have a start time of interval i on day h, and zero otherwise, $L_k$ is the set of all work patterns satisfying the weekly scheduling rules for tour group k, $Q_{kl}$ is the number of agents scheduled using tour group k and work pattern l, $D_k^{max}$ is the maximum number of agents that can be scheduled using tour k, $D_k^{min}$ is the minimum number of agents that must be scheduled ("must-work agents") using tour group k, $A_{klh}$ is equal to one if day h is a work day for agents assigned to work pattern l for tour group k, and zero otherwise, $C_{kl}$ is the weekly cost (e.g. benefits, etc.) of scheduling an agent using tour k and work pattern l, $c_{knhi}$ is the daily cost of an agent scheduled using tour group k and shift template n with shift start time of interval i on day h, $b_{ht}$ is the required staffing level in period t on day h, $B_{ht}$ is the number of agents by which the agents scheduled and not on a break is less than ("staffing shortage") the required staffing level in interval t on day h, $O_{ht}$ is the number of agents by which the agents scheduled and not on a break is greater than ("staffing excess") the required staffing level in interval t on day h, $P_{ht}$ is a large positive penalty cost for having staffing shortage in interval t on day h.

Penalty cost $P_{ht}$ is for each unit of staffing shortage and set to a value that is sufficiently larger than $C_{kl}$ and $c_{knhi}$ for all kεK to make sure that shortage variables $B_{ht}$ will be zero in a solution to the MILP model when there is sufficient agent availability to meet or exceed required staffing levels.

When shift start times are specified for each template in $F_k$ for tour group k, the set of start times is extended as $I_{khn}$ to include them. Tour groups with this type of shift start times are also within the scope of the MILP model and the method of the invention.

Constraints (9) and (10) can also be expressed as a range constraint in the MILP model of the invention as follows:

$$\Sigma_{l \epsilon L k} Q_{kl} + R_k = D_k^{max}, k \epsilon K, \quad (12)$$

$$R_k \leq D_k^{max} - D_k^{min}, k \epsilon K, \quad (13)$$

$$R_k \geq 0 \text{ and integer for all } k \epsilon K. \quad (14)$$

The MILP model (1-11) of the invention is presented for daily shifts that start and end within the same day to simplify the presentation. The MILP model of the method of the invention can be easily restated for agent scheduling using shift templates allowing daily shifts that are starting in one day and ending in the following day. For example, this could be the case for daily shifts crossing midnight at centers that may be open 24 hours and 7 days a week or close after midnight daily. Suppose tour group k has a shift template n and a start time of i. Furthermore, suppose if daily shifts are scheduled using shift template n and start time of i on day (h−1), those shifts would end on day h. In this case, the decision variable for the number of agents scheduled using template n of tour group k and with a shift start time of i on day (h−1), $X_{kn(h-1)i}$, is added to the left side of constraint (2) for the intervals on day h during which their shifts will be continuing. Likewise, break variables $U_{kni(h-1)t}$, $W_{kni(h-1)t}$, $W_{kni(h-1)(t-1)}$, and $V_{kni(h-1)t}$ for a shift starting on (h−1) but continuing into day h may partially or entirely scheduled on day h. They are also included in constraint (2) for the intervals on day h which are in their break windows, similar to $X_{kn(h-1)i}$. Thus, $T1_{knh2t}$, $T2_{knh2t}$ and $T3_{knh2t}$ are redefined as the sets of all shift start times on day h or day (h−1) for shift template n in $F_k$ for tour group k for which interval t on day h is a $1^{st}$, $2^{nd}$, or $3^{rd}$ break start period, respectively.

Figure 5:
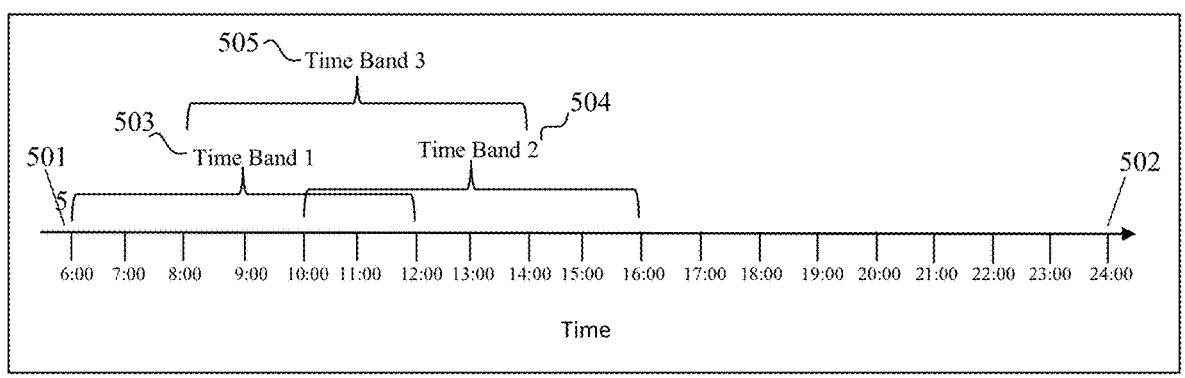
FIG. 5 shows an example for the creation of start time bands.

When an agent's daily shift start times vary from one day to another, shifts scheduled for the agent on successive days should be separated to provide sufficient time for the agent to sleep and rest ("shift separation period"). For example, an agent's shift start times for two consecutive work days have to be restricted so that the shift start time on the second day will be separated from the shift end time on the first day by 10 hours so that the agent can rest. This restriction is satisfied by the method of the invention by creating pseudo tour groups ("pseudo tour group") by splitting all possible shift start times on a day into time bands. Time bands are created so that the shift end time for the latest shift start time in a time band will be separated from the earliest start time of the time band on the following day by at least the desired amount of time. FIG. 5 shows operating hours for a contact center where agents may have shifts between the day start time 501 of 6:00 to the day end time 502 of 24:00 every day over the schedule period. If agents are scheduled using a tour group comprising one or more shift templates with 8-hour lengths, then the earliest shift start time is 6:00 and the latest shifts start time is 16:00 so that the latest starting shift will end by the day end time of 24:00. If the tour group also specifies that the shift start times may vary from one work day to another, and that there should be a 10-hour shift separation period between the shift end time on a day and the shift start time on the following day for an agent, then the available shift start times between 6:00 and 16:00 are split into at least two time bands. Time band 1 503 includes the shift start times from 6:00 to 12:00, and time band 2 504 includes the shift start times from 10:00 to 16:00. Additional time bands can also be created. For example, a third time band 505 may also be created to have the shift start times from 8:00 to 14:00. The method of the invention creates three pseudo tour groups with start times in the three time bands shown in FIG. 5 to replace the original tour group specified in the set tour groups K to meet the original tour group's shift separation constraint. The newly created three tour groups have the same work and non-work day constraints and shift templates with the original tour group. The only difference between the three new tour groups created, and the three new tour groups and the original tour group is in the shift start times allowed. Agents to be scheduled using the original tour group are scheduled using any of the newly created pseudo tour groups.

Pseudo tour groups created for a tour group are added to the set of tour groups K. Separate decision variables $X_{knhi}$, $Q_{kl}$, $U_{kniht}$, $W_{kniht}$ and $V_{kniht}$ added to constraint (2), and constraints (3-8) are created for each pseudo tour group as described before and included in the MILP model of the invention. The MILP model of the invention, however, does not create separate constraints (9) and (10) for pseudo tour groups. For example, for the pseudo tour groups created for tour group k, the method of the invention creates one of each constraints (9) and (10) for the minimum $D_k^{min}$ and maximum number of agents specified for tour group k to include decision variables $Qm_l$ for every pseudo tour group m created for tour group k.

If a shift template for tour group k does not require a $1^{st}$, $2^{nd}$ or $3^{rd}$ break, then no decision variable is defined for that break or added to the MILP model of the invention. For example, if a shift template n for tour group k does not require a $3^{rd}$ break, the sets $B3_{knih}$ and $T3_{knht}$ are empty sets with no elements in them. Therefore, no decision variables for the $3^{rd}$ break, $V_{kniht}$ and constraint (5) for that shift template is defined or included in the MILP model (1-11). Likewise, if shift template n specified for tour group k is specifying no break during a shift, $B13_{knih}$, $T1_{knht}$, $B2_{knih}$, $T2_{knht}$, $B3_{knih}$ and $T3_{knht}$ are empty sets. Decision variables $U_{kniht}$, $V_{kniht}$ and $V_{kniht}$ and constraints (3-5) are not defined for shift template n or added in the MILP model (1-11) of the invention.

Although objective function (1) was presented as a cost function to be minimized, it should be clear to people with ordinary skill in the art that it can be replaced by other functions to be minimized or maximized. For example, in one embodiment, objective function (1) may be replaced by a total agent time or total paid agent time function to be minimized. In yet another embodiment, objective function may be the total revenues or total profit generated by scheduled agent to be maximized. These and other variations of the objective function of the MILP model are also within the scope of the invention.

Figure 6:
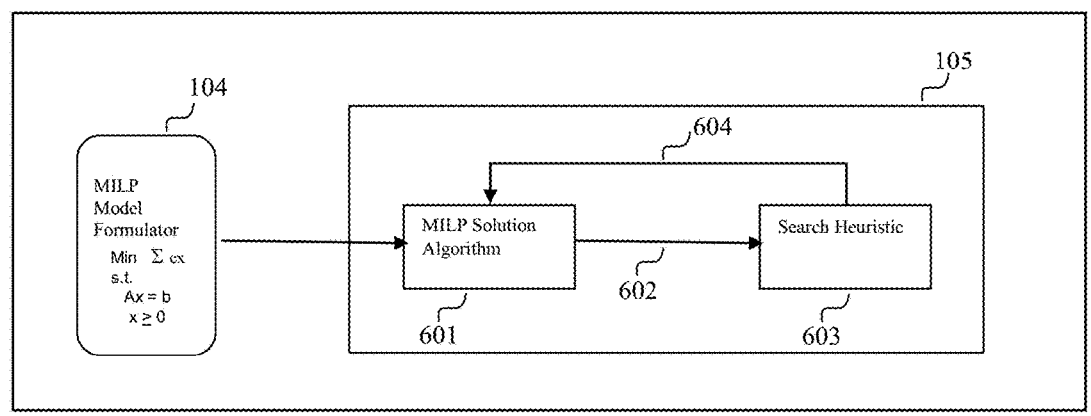
FIG. 6 shows a high level flowchart for the MILP&SH algorithm.

As FIG. 6 shows, to generate schedules in the MILP model solver and schedule generator 105, the method of the invention uses an MILP&SH algorithm. According to the present invention, there is a non-transitory computer implemented code with access to memory when executed performs the MILP&SH algorithm.

The MILP&SH algorithm of the method of the invention comprises of an MILP solution algorithm ("MILP solution algorithm") 601 and a search heuristic ("search heuristic") 603. The MILP model is repeatedly solved by the MILP solution algorithm. When a solution does not meet integer value constraints for the integer variables of the MILP mode (1-11), the solution is inputted 602 to the search heuristic. The search heuristic 603 is applied to find an integer feasible solution with integer values for all decision variables restricted to integer values in (11) in the MILP model.

There are a number of known MILP solution algorithms (Wolsey, 1998). For example, the Branch and Bound algorithm ("B&B algorithm") is a well-known algorithm for solving MILP models. The Cutting Plane algorithm ("CP algorithm") is another known MILP solution algorithm. Detailed descriptions of these and other MILP solution algorithms are found in Wolsey (1998), and other books and scientific articles on integer programming. The MILP&SH algorithm of the method of the invention is applied using one of these MILP solution algorithms or a combination of them.

The MILP&SH algorithm initially sets the objective value for the best solution ("best solution") to the MILP model to a very large positive value if objective function (10) is of minimization type, and to a very large negative value if objective function is of maximization type. At the start, the MILP&SH algorithm relaxes integer value constraints in (11) and solves the linear programming relaxation ("LP relaxation") of the MILP model. One of the known algorithms for solving LP relaxation of an MILP model is the Simplex method (Wolsey, 1998). Values of the decision variables in the solution of the LP relaxation at the start may or may not satisfy the integer value constraints in (11). If the solution satisfies integer value constraints for all integer variables, an optimal solution to the MILP model is found and the MILP&SH terminates with the optimal values for the decision variables. Otherwise, the search heuristic of the MILP&SH algorithm is applied to the solution to the LP relaxation to obtain an integer feasible solution. If an integer feasible solution is found after applying the search heuristic, the MILP&SH algorithm stores this first integer feasible solution as the best solution and updates the objective function value for the best solution in the computer memory.

The MILP&SH algorithm repeats these steps iteratively ('iteration') as described below. In each iteration, one or more new constraints are added by the MILP solution algorithm 601 to eliminate fractional values for one or more integer variables. The LP relaxation of the MILP problem is then solved with the new constraints and any other added prior to the new constraints to generate a new solution to the MILP model. For example, the B&B algorithm creates new branches with sub-problems by adding constraints on a decision variable with a fractional value in the solution of the preceding sub-problem while the CP algorithm adds more sophisticated new constraints called "cuts" to the LP relaxation to eliminate fractional values for the integer variables (Wolsey, 1998). The search heuristic 603 is then applied to the new solution to find a new integer feasible solution. The objective function value for the new integer feasible solution is compared with the objective function value for the best solution. The best solution is replaced by the new integer feasible solution if the new integer feasible solution has a better objective function value. Otherwise, the new integer feasible solution is discarded.

Iterations of the MILP&SH algorithm of the method of the present invention are continued until one or more stopping conditions ("stopping conditions") are satisfied. The algorithm is terminated when the stopping conditions are met with the best solution. In one embodiment, stopping conditions may comprise executing the non-transitory computed implemented code performing the MILP&SH algorithm for a certain amount of time or until generating a specified number of integer feasible solutions to the MILP model by the MILP&SH algorithm. In another embodiment, the stopping condition may be the difference between a lower bound on the objective function value and the objective function value for the best solution being less than a predefined value or percentage. The MILP solution algorithms provide lower bounds on the objective function value for the optimal integer feasible solution to an MILP model. In yet another embodiment, any combination of these stopping conditions may be specified and the MILP&SH algorithm be terminated either one or all of them are met.

As described earlier in the patent document, the MILP&SH algorithm may use different MILP solution algorithms or their combinations. Similarly, the search heuristics used in the MILP&SH algorithm may be applied using different search algorithms. In one embodiment of the method of the invention, the search heuristic 603 comprises of a rounding heuristic with steps to round the fractional values of the integer variables to obtain an integer feasible solution. The search heuristic may comprise the following steps:

Step 1. Receive the values of all decision variables in a solution found 602 by the MILP solution algorithm 601. If the solution is an integer feasible solution, go to Step 12. Otherwise, go to Step 2.

Step 2. Discard the fractional parts of values ("rounded values") of the integer variables $X_{knhi}$, $Q_{kl}$, $U_{kniht}$, $W_{kniht}$ and $V_{kniht}$ received in Step 1. Go to Step 3.

Step 3. Recalculate the values of $B_{ht}$, and $O_{ht}$ by substituting the rounded values of the integer variables $X_{knhi}$, $Q_{kl}$, $U_{kniht}$, $W_{kniht}$ and $V_{kniht}$ in constraint (2). Go to step 4.

Step 4. Substitute the rounded values of the decision variables $X_{knhi}$ and $Q_{kl}$ in constraints (6), (7) and (8). Increase or decrease the rounded values of one or more $X_{knhi}$ in integer numbers to make the right side of constraint (6) equal to the left side while satisfying constraints (7) and (8). Go to step 5.

Step 5. Recalculate the values of $B_{ht}$, and $O_{ht}$ by substituting the rounded values of the integer variables $X_{knhi}$, $Q_{kl}$, $U_{kniht}$, $W_{kniht}$ and $V_{kniht}$ in constraint (2). Go to step 6.

Step 6. Substitute the rounded values of the integer variables $X_{k}j$, $U_{kniht}$, $W_{kniht}$ and $V_{kniht}$ in constraints (3), (4) and (5). Increase or decrease the rounded values of one or more $U_{kniht}$, $W_{kniht}$ and $V_{kniht}$ in integer numbers to make the right side of constraints (3), (4) and (5) equal to the left side. Go to step 7.

Step 7. Recalculate the values of $B_{ht}$, and $O_{ht}$ by substituting the rounded values of the integer variables $X_{knhi}$, $Q_{kl}$, $U_{kniht}$, $W_{kniht}$ and $V_{kniht}$ in constraint (2). Go to step 8.

Step 8. Substitute the values of decision variables $Q_{kl}$ in constraint (10). If constraint (10) is not satisfied for one or more tour groups, got to Step 9. Otherwise, go to Step 10.

Step 9. Increase the rounded values of one or more decision variables $Q_{kl}$ so that when the required number of shifts are scheduled by increasing the rounded values of the associated $X_{knhi}$ in integer numbers to satisfy constraints (6-8), they result in the greatest reduction in $B_{ht}$ variables with positive values and satisfy constraint (10). Go to step 4.

Step 10. If the values of the decision variables $B_{ht}$ are zero for all interval t and day h, go to Step 13. Otherwise, go to Step 11.

Step 11. If there is any $B_{ht}$ with a positive value indicating agent shortages in one or more intervals, select Qu which, when its rounded value is increased by one and constraints (3-8) are satisfied, will not exceed $D_k^{max}$ in constraint (9) and result in the greatest reduction in the values of variables $B_{ht}$ with positive values. Increase its value by one and go to Step 4. If no variable Qu can be increased without exceeding $D_k^{max}$ in constraint (9), go to Step 12.

Step 12. Calculate the objective values for the integer feasible solution found by substituting the rounded values of the decision variables received from step 11 in the objective function (1), If the objective function value for the integer feasible solution found after applying Steps 1-11 above is better than the objective function value for the best solution, update the best solution by replacing the rounded values of the integer variables $X_{knhi}$, $Q_{kl}$, $U_{kniht}$, $W_{kniht}$ and $V_{knint}$ for the best solution with the values of the decision variables in the integer feasible solution, and go to Step 13. Otherwise, go to Step 14.

Step 13. Generate detailed agent schedules according to the rounded values of the integer variables $X_{knhi}$, $Q_{kl}$, $U_{kniht}$, $W_{kniht}$ and $V_{kniht}$ in the best solution found.

Step 14. Terminate if the stopping conditions are satisfied. Otherwise, return to the MILP solution algorithm.

As described earlier in this patent document, the MILP&SH algorithm may include different MILP solution algorithms or their combinations. Similarly, in one embodiment, the search heuristics used in the MILP&SH algorithm may include the rounding algorithm described in Steps 1-14 above. In another embodiment, instead of rounding down the values of the integer variables, the search heuristic may round down if the fractional part of the value of a decision variable is less than 0.50 and up if it is greater than or equal to 0.50 and adjust the values of the integer variables to find an integer feasible solution. In yet another embodiment, the search heuristic may be replaced by a Tabu search algorithm, enumeration algorithm or may be supplemented with a two-way, three-way or multi-way schedule exchange algorithm. A method using a two-way exchange algorithm for agent scheduling without an MILP model is described in U.S. Pat. No. 6,278,978 granted to Andre and Nourbakhsh in 2001. In yet another embodiment, the MILP&SH algorithm is applied without a search heuristic using the MILP solution algorithm only. For example, the B&B or CP algorithm is applied until one or more stopping conditions are satisfied by an integer feasible solution. These variations of the MILP&SH algorithm are also within the scope of the present invention.

Upon the satisfaction of the stopping conditions, the MILP&SH algorithm terminates with the best solution found for the MILP. Agent schedules according to the values of the decision variables in the best solution found by the MILP&SH algorithm are produced in the rostering step 106 of the agent scheduling system.

Having thus described my invention, what I claim as new and desire to secure by Letters Patent is as follows:

1. A computer implemented method for agent scheduling for a plurality of agents, where agents' schedules are partly defined using tour groups comprising rules and templates, the method comprising:
   a. acquiring, by a computer, from one or more computer systems scheduling environment information including a schedule period, intervals during the schedule period agents can work, tour groups wherein each tour group includes a minimum and maximum number of work days constraint during the schedule period for all agent schedules created using the tour group, shifts templates, minimum and maximum number of agents to schedule using each tour group, and schedule period;
   b. acquiring, by the computer, from one or more computer systems required staffing levels for the intervals during the scheduling period;

c. acquiring, by the computer, from one or more computer systems an objective criterion and a direction for optimization as minimization or maximization of the objective function value;

d. formulating, by the computer, a Mixed Integer Linear Program model with decision variables, an objective function based on the objective criterion acquired and constraints to enforce the tour group and shift template rules, wherein the objective function value evaluated for an integer feasible solution with the objective function of the Mixed Integer Linear Program model provides a measure to compare a plurality of integer feasible solutions to determine a best solution, and the requirement for meeting required staffing levels in a solution of the Mixed Integer Linear Program model;

e. executing, by the computer, the steps of a Mixed Integer Linear Program and Search Heuristic algorithm to generate integer feasible solutions to the Mixed Integer Linear Program model until one or more stopping conditions are satisfied, wherein the Mixed Integer Linear Program and Search Heuristic algorithm repeats the steps of the Mixed Integer Linear Program solutions algorithm to find a plurality of solutions to the Mixed Integer Linear Program model and executes, for each said solution by the Mixed Integer Linear Program solution algorithm, the steps of the search heuristic to find an integer feasible solution to the Mixed Integer Linear Program model;

f. generating, by the computer, agent schedules based on the Mixed Integer Linear Program model found by the Mixed Integer Linear Program and Search Heuristic algorithm; and g. inputting, by the computer, the agent schedules to one or more computer systems for rostering.

2. The computer implemented method for agent scheduling recited in claim 1 wherein the minimum and maximum number of work days specified by a tour group are either equal or the minimum number of work days is less than the maximum number of work days.

3. The computer implemented method for agent scheduling recited in claim 1 wherein the minimum and maximum number of work days specified by a tour group are satisfied by selecting the work patterns over the schedule period that have the number of work days greater than or equal to the minimum work day constraint for the tour group, and less than or equal to the maximum work day constraint for the tour group.

4. The computer implemented method for agent scheduling recited in claim 1 wherein each shift template in a tour group includes a minimum and a maximum number of work days to be scheduled using the shift template.

5. The computer implemented method for agent scheduling recited in claim 4 wherein the minimum and a maximum number of work days to be scheduled using the shift template are greater than or equal to the minimum number of work days specified for the tour group and less than or equal to the maximum number of work days specified for the tour group for all agent schedules created using the tour group.

6. The computer implemented method for agent scheduling recited in claim 4 wherein either the minimum and maximum number of work days to be scheduled using the shift template are either equal or the minimum number of work days is less than the maximum number of work days.

7. The computer implemented method for agent scheduling recited in claim 4 wherein the minimum and maximum number of work days to be scheduled using a shift template are included in the Mixed Integer Linear Program model as a plurality of constraints.

8. The computer implemented method for agent scheduling recited in claim 1 wherein the Mixed Integer Linear Program and Search Heuristic algorithm comprises a Mixed Integer Linear Program solution algorithm and a search heuristic.

9. The computer implemented method for agent scheduling recited in claim 1 wherein the Mixed Integer Linear Program and Search Heuristic algorithm calculates the objective function value for an integer feasible solution found and compares it with the objective function value for the best solution to determine if the integer feasible solution has an objective function value to replace the best solution.

10. A system for agent scheduling comprising:
a computer;
memory;
non-transitory computer implemented code with access to the memory, which, when executed, configures the computer to:

a. acquire from one or more computer systems scheduling environment information including a schedule period, intervals during the schedule period agents can work, tour groups wherein each tour group includes a minimum and maximum number of work days constraint during the schedule period for all agent schedules created using the tour group, shifts templates, minimum and maximum number of agents to schedule using each tour group, and schedule period;

b. acquire from one or more computer systems required staffing levels for the intervals during the scheduling period;

c. acquire from one or more computer systems an objective criterion and a direction for optimization as minimization or maximization of the objective function value;

d. formulate a Mixed Integer Linear Program model with decision variables, an objective function based on the objective criterion acquired and constraints to enforce the tour group and shift template rules, wherein the objective function value evaluated for an integer feasible solution with the objective function of the Mixed Integer Linear Program model provides a measure to compare a plurality of integer feasible solutions to determine a best solution, and the requirement for meeting required staffing levels in a solution of the Mixed Integer Linear Program model;

e. execute the steps of a Mixed Integer Linear Program and Search Heuristic algorithm to generate integer feasible solutions to the Mixed Integer Linear Program model until one or more stopping conditions are satisfied, wherein the Mixed Integer Linear Program and Search Heuristic algorithm repeats the steps of the Mixed Integer Linear Program solutions algorithm to find a plurality of solutions to the Mixed Integer Linear Program model and executes, for each said solution by the Mixed Integer Linear Program solution algorithm, the steps of the search heuristic to find an integer feasible solution to the Mixed Integer Linear Program model;

f. generate agent schedules based on the Mixed Integer Linear Program model found by the Mixed Integer Linear Program and Search Heuristic algorithm; and g. input the agent schedules to one or more computer systems for rostering.

11. A computer program product for agent scheduling comprising:
  non-transitory computer implemented code, which, when executed, configures a computer to:
  a. acquire from one or more computer systems scheduling environment information including a schedule period, intervals during the schedule period agents can work, tour groups wherein each tour group includes a minimum and maximum number of work days constraint during the schedule period for all agent schedules created using the tour group, shifts templates, minimum and maximum number of agents to schedule using each tour group, and schedule period;
  b. acquiring from one or more computer systems required staffing levels for the intervals during the scheduling period;
  c. acquire from one or more computer systems an objective criterion and a direction for optimization as minimization or maximization of the objective function value;
  d. creating formulate a Mixed Integer Linear Program model with decision variables, an objective function based on the objective criterion acquired and constraints to enforce the tour group and shift template rules wherein the objective function value evaluated for an integer feasible solution with the objective function of the Mixed Integer Linear Program model provides a measure to compare a plurality of integer feasible solutions to determine a best solution, and the requirement for meeting required staffing levels in a solution of the Mixed Integer Linear Program model;
  e. execute the steps of a Mixed Integer Linear Program and Search Heuristic algorithm to generate integer feasible solutions to the Mixed Integer Linear Program model until one or more stopping conditions are satisfied, wherein the Mixed Integer Linear Program and Search Heuristic algorithm repeats the steps of the Mixed Integer Linear Program solutions algorithm to find a plurality of solutions to the Mixed Integer Linear Program model and executes, for each said solution by the Mixed Integer Linear Program solution algorithm, the steps of the search heuristic to find an integer feasible solution to the Mixed Integer Linear Program model;
  f. generate agent schedules based on the Mixed Integer Linear Program model found by the Mixed Integer Linear Program and Search Heuristic algorithm; and
  g. input the agent schedules to one or more computer systems for rostering.

12. The system for agent scheduling recited in claim 10 wherein the minimum and maximum number of work days specified by a tour group are either equal or the minimum number of work days is less than the maximum number of work days.

13. The system for agent scheduling recited in claim 10 wherein the minimum and maximum number of work days specified by a tour group are satisfied by selecting the work patterns over the schedule period that have the number of work days greater than or equal to the minimum work day constraint for the tour group, and less than or equal to the maximum work day constraint for the tour group.

14. The system for agent scheduling recited in claim 10 wherein each shift template in a tour group includes a minimum and a maximum number of work days to be scheduled using the shift template.

15. The system for agent scheduling recited in claim 14 wherein the minimum and a maximum number of work days to be scheduled using the shift template are greater than or equal to the minimum number of work days specified for the tour group and less than or equal to the maximum number of work days specified for the tour group for all agent schedules created using the tour group.

16. The system for agent scheduling recited in claim 14 wherein either the minimum and maximum number of work days to be scheduled using the shift template are either equal or the minimum number of work days is less than the maximum number of work days.

17. The system for agent scheduling recited in claim 14 wherein the minimum and maximum number of work days to be scheduled using a shift template are included in the Mixed Integer Linear Program model as a plurality of constraints.

18. The system for agent scheduling recited in claim 10 wherein the Mixed Integer Linear Program and Search Heuristic algorithm comprises a Mixed Integer Linear Program solution algorithm and a search heuristic.

19. The system for agent scheduling recited in claim 10 wherein the Mixed Integer Linear Program and Search Heuristic algorithm calculates the objective function value for an integer feasible solution found and compares it with the objective function value for the best solution to determine if the integer feasible solution has an objective function value to replace the best solution.

* * * * *